(12) United States Patent
Wilson et al.

(10) Patent No.: US 8,065,562 B2
(45) Date of Patent: Nov. 22, 2011

(54) SYSTEMS, METHODS AND DEVICES FOR BACKUP POWER CONTROL IN DATA STORAGE DEVICES

(75) Inventors: Dean Clark Wilson, Lonsdale, MN (US); Darren Edward Johnston, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 28 days.

(21) Appl. No.: 12/632,539

(22) Filed: Dec. 7, 2009

(65) Prior Publication Data

US 2010/0332896 A1    Dec. 30, 2010

Related U.S. Application Data

(60) Provisional application No. 61/220,915, filed on Jun. 26, 2009.

(51) Int. Cl.
*G06F 11/00* (2006.01)
(52) U.S. Cl. .......................................... 714/22; 714/721
(58) Field of Classification Search ................... 714/22, 714/25, 721; 713/340; 320/136, 167; 365/226, 365/228
See application file for complete search history.

(56) References Cited

U.S. PATENT DOCUMENTS

| | | | |
|---|---|---|---|
| 4,510,400 A | 4/1985 | Kiteley | |
| 4,874,960 A * | 10/1989 | Cybela et al. | 307/64 |
| 5,367,489 A | 11/1994 | Park et al. | |
| 5,414,861 A * | 5/1995 | Horning | 365/229 |
| 5,459,850 A | 10/1995 | Clay et al. | |
| 5,483,486 A | 1/1996 | Javanifard et al. | |
| 5,497,119 A | 3/1996 | Tedrow et al. | |
| 5,537,360 A | 7/1996 | Jones et al. | |
| 5,546,042 A | 8/1996 | Tedrow et al. | |
| 5,567,993 A | 10/1996 | Jones et al. | |
| 5,592,420 A | 1/1997 | Cernea et al. | |
| 5,914,542 A | 6/1999 | Weimer et al. | |
| 5,959,926 A | 9/1999 | Jones et al. | |
| 6,091,617 A | 7/2000 | Moran | |
| 6,404,647 B1 | 6/2002 | Minne' | |
| 6,567,261 B2 | 5/2003 | Kanouda et al. | |
| 6,700,352 B1 | 3/2004 | Elliott et al. | |
| 6,788,027 B2 * | 9/2004 | Malik | 320/134 |

(Continued)

OTHER PUBLICATIONS

N. Li, J. Zhang, and Y. Zhong, "A Novel Charging Control Scheme for Super Capacitor Energy Storage in Photovoltaic Generation System," DRPT2008 Apr. 6-9, 2008 Nanjing China.

(Continued)

*Primary Examiner* — Joshua Lohn
(74) *Attorney, Agent, or Firm* — Crawford Maunu PLLC (57) ABSTRACT

Power-backup capabilities are provided by implementing a variety of different methods, systems and devices. According to one such implementation, a capacitive storage circuit is operated at a threshold voltage that is set to provide sufficient power to operate backup functions of a data storage device, and that is further selectively adjusted during a test period to maintain such sufficient power while also providing power to carry out test functions. In other implementations, the threshold voltage is set in response to operating characteristics of one or more of a data storage device to which backup power is to be provided and the capacitive storage circuit itself. The threshold voltage is reduced or otherwise maintained at a low level that is yet sufficient to supply appropriate power (e.g., thus maintaining the capacitive circuit at a voltage level that is about as low as possible, which can enhance operational characteristics of the capacitive circuit).

20 Claims, 6 Drawing Sheets

U.S. PATENT DOCUMENTS

| | | | |
|---|---|---|---|
| 6,838,923 | B2 | 1/2005 | Pearson |
| 6,981,161 | B2 | 12/2005 | Koo |
| 7,019,583 | B2 | 3/2006 | Del Signore, II et al. |
| 7,173,821 | B2 | 2/2007 | Coglitore |
| 7,177,222 | B2 | 2/2007 | Spengler |
| 7,233,890 | B2 | 6/2007 | Shapiro et al. |
| 7,268,998 | B2 | 9/2007 | Ewing et al. |
| 7,269,755 | B2 * | 9/2007 | Moshayedi et al. ............... 714/2 |
| 7,305,572 | B1 | 12/2007 | Burroughs et al. |
| 7,310,707 | B2 | 12/2007 | Olds et al. |
| 7,318,121 | B2 | 1/2008 | Gaertner et al. |
| 7,321,521 | B2 | 1/2008 | Spengler |
| 7,334,144 | B1 | 2/2008 | Schlumberger |
| 7,404,073 | B2 | 7/2008 | Felts |
| 7,404,131 | B2 | 7/2008 | McCarthy et al. |
| 7,414,335 | B2 | 8/2008 | Hussein et al. |
| 7,487,391 | B2 | 2/2009 | Pecone et al. |
| 2006/0015683 | A1 * | 1/2006 | Ashmore et al. ............... 711/113 |
| 2006/0069870 | A1 * | 3/2006 | Nicholson et al. ............ 711/118 |
| 2006/0080515 | A1 | 4/2006 | Spiers et al. |
| 2007/0033431 | A1 * | 2/2007 | Pecone et al. ..................... 714/6 |
| 2007/0223870 | A1 | 9/2007 | Farling et al. |
| 2008/0007219 | A1 | 1/2008 | Williams |
| 2008/0232144 | A1 | 9/2008 | Klein |
| 2009/0006877 | A1 | 1/2009 | Lubbers et al. |
| 2009/0254772 | A1 * | 10/2009 | Cagno et al. .................. 713/340 |
| 2009/0323452 | A1 * | 12/2009 | Cagno et al. .................. 365/227 |
| 2010/0052625 | A1 * | 3/2010 | Cagno et al. .................. 320/166 |

OTHER PUBLICATIONS

ECNmag.com, "1.2A, 1.6MHz Synchronous Boost Regulator from Linear Technology," Top News, Jan 8, 2009.

Intel® Mainstream SATA Solid State Drives, "Intel® X25-M and X18-M Mainstream SATA Solid-State Drives".

"Get the Lowdown on Ultracapacitors," Penton Media, Inc., Nov. 15, 2007.

STMicroelectronics, "Regulating Pulse Width Modulators, SG3524," Jul. 2000.

Linear Technology, "1.2A Synchronous Step-up DC/DC Converter with Input Current Limit, LTC3125," 2008.

* cited by examiner

SYSTEMS, METHODS AND DEVICES FOR BACKUP POWER CONTROL IN DATA STORAGE DEVICES

RELATED PATENT DOCUMENTS

This patent document claims the benefit under 35 U.S.C. §119(e) of U.S. Provisional Patent Application Ser. No. 61/220,915 filed on Jun. 26, 2009, and which is fully incorporated herein by reference.

FIELD OF THE INVENTION

Aspects of the present invention relate to power control features that can be particularly useful for memory applications in which data integrity is an issue.

BACKGROUND

Computer systems generally have several levels of memory; each level of memory can provide differing levels of speed, memory capacity, physical size, power requirements, voltage levels and/or volatility. These aspects are often at odds with each other. For example, increases in speed often lead to corresponding increases in power requirements. For this reason, many systems use a variety of different memories within the same system. From the view of the processor, these memories are often hidden in the sense that common data is temporarily cached in smaller and faster memory circuits. This common data is mapped to larger and slower memory circuits, which are accessed when the faster memory does not contain the desired data. The common data, if changed in the cached memory, can eventually be written to the larger and slower memory circuits. This allows for the slow memory access time to be hidden so long as the faster memory contains the appropriately mapped data.

Computer systems generally contain some type of mass-storage memory that is able to store data when the computer system is powered down or when the memory otherwise loses power. This type of memory is referred to as nonvolatile memory because it is able to maintain data integrity when the computer system is not powered. Nonvolatile memory, however, can be slower by orders of magnitude relative to various volatile memories. Yet, nonvolatile memory can also be less expensive (per unit of memory capacity) and/or less power hungry.

A common type of nonvolatile mass-storage device is a hard disc drive (HDD) that uses a rotating magnetic media. HDDs are used for home-computers, servers, enterprise applications and various other devices. Under normal operation, a computer system transfers sensitive data from temporary memory to a HDD before the computer system is powered down. This allows for the sensitive data to be saved in memory that persists after the power is removed from the computer system. When the computer system is subsequently powered up, this data can be accessed and used by the computer system. HDDs with rotating magnetic media have been in use for many years and have undergone various improvements including efficiency, reliability and memory capacity. Various applications, however, are beginning to use other types of nonvolatile memory with more frequency.

Solid State Devices (SSDs) are one such alternative nonvolatile storage device. SSDs are attractive for many applications because, unlike HDDs, they have no need for moving parts. Thus, they are not subject to mechanical wear inherent in HDDs. One type of SSD uses nonvolatile flash memory to store data. Flash memory is often used for handheld devices for which space and/or power requirements are at a premium. Generally, SSDs are not susceptible to issues relating to physical movement as are relevant to an HDD in which such movement can interrupt accesses to the rotating media. Thus, HDDs often include various mechanisms to compensate for mechanical shocks. Speed, cost and power requirements also factor into the selection of SSDs or HDDs.

While SSDs exhibit various desirable characteristics as relative, for example, to rotating magnetic media, the implementation of SSDs remains challenging and SSDs have not yet replaced HDDs with rotating magnetic media. For example, backing up information in volatile memory can be difficult under power failure conditions, as power capabilities of various backup power supplies can degrade over time. Under such conditions, backup power capabilities can be insufficient to ensure all data is written from the volatile memory circuit during a power-loss event.

Aspects of the present invention, although not limited thereto, can be appreciated in the context of such mass-memory storage devices.

SUMMARY

The present invention is directed to systems and methods for use with power control features of a variety of data storage applications, including those susceptible to power failure as described above. These and other aspects of the present invention are exemplified in a number of illustrated implementations and applications, some of which are shown in the figures and characterized in the claims section that follows.

According to an example embodiment of the present invention, a backup power circuit powers each of a data storage circuit in response to a power interruption using a capacitive circuit to store energy, a control circuit to charge the capacitive circuit and a test circuit to test the capacitive circuit. The capacitive circuit is configured to store and use capacitive energy for powering backup functions of the data storage circuit in response to a power interruption, and for powering a test load to test the capacitive circuit. The test circuit detects operational characteristics of the capacitive circuit in response to the capacitive circuit powering the test load. The control circuit charges the capacitive circuit to a backup threshold voltage for powering the backup functions of the data storage circuit, and boosts the charge in the capacitive circuit to a test threshold voltage for powering the test load during a test period, with the respective thresholds being set in response to the detected operational characteristics. Accordingly, the test threshold voltage is higher than the backup threshold voltage, which are respectively applied to reduce the overall charge level at which the capacitive circuit is operated.

Other embodiments are directed to data storage devices, control circuits and other related arrangements that operate in accordance with the above-discussed and other embodiments described herein.

The above summary is not intended to describe each illustrated embodiment or every implementation of the present invention. The figures and detailed description that follow, including that described in the appended claims, further exemplify embodiments of the present invention.

BRIEF DESCRIPTION OF THE DRAWINGS

The invention may be more completely understood in consideration of the detailed description of various embodiments of the invention that follows in connection with the accompanying drawings as follows.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present invention are believed to be useful for power control in data storage devices, circuits and systems. A particular application of the present invention relates to providing backup power operation for data storage devices such as solid state devices (SSDs) that provide nonvolatile-type memory storage. While the present invention is not necessarily limited to such applications, various aspects of the invention may be appreciated through a discussion of various examples using this context.

In connection with an example embodiment of the present invention, a backup power circuit includes a capacitive circuit that stores and uses capacitive energy to power backup functions of a data storage circuit in response to a power interruption, and to power a test load circuit under test conditions. An adaptive control circuit increases the charge in the capacitive circuit to a test voltage level (i.e., a boost level) during test operations, with the test voltage level corresponding to a charge in the capacitive circuit that is sufficient to power the backup functions of the data storage circuit as well as the test load circuit. The control circuit further controls the capacitive circuit to power the data storage circuit in response to a power condition such as an interruption or outage of power.

In the context of various example embodiments, the term "boost" or a "boost level" generally refers to a voltage or charge level for an energy storage circuit, such as a capacitive storage circuit, that is higher than a normal operating level. Such a boost level may be provided in various manners. For instance, where applicable to voltage, a boost level may be implemented as a higher voltage level supplied by a power supply, as a voltage level that is generated by a boost circuit to increase the level beyond that provided by a power supply, or as a voltage level that is generated by a buck circuit to reduce the voltage, relative to that provided by a voltage supply, to the threshold voltage. In the latter buck circuit instance, the boost level voltage is thus reduced relative to the voltage supply but is higher than a threshold voltage used for normal operation.

The control circuit thus facilitates operation of the capacitive circuit at a test voltage level during (or in preparation for) test operation, with the test voltage level being higher than the voltage level of the capacitive circuit during normal (backup-ready) operation. Accordingly, the control circuit operates to ensure that enough capacitive energy is available for powering the backup functions while also powering the test load circuit (or soon after the test load circuit has partially drained charge from the capacitive circuit).

The control circuit further controls (passively or actively) the operation of the capacitive circuit at a low voltage level when stored charge for the test load circuit is not needed. For example, the control circuit may be responsive to the initiation of a test cycle by charging the capacitive circuit to the test voltage level, and maintains the capacitive circuit at a lower backup voltage level after the test operation has drained the charge added to the capacitive circuit via the boost. The control circuit thus limits the application of an increased charge to the capacitive circuit to those times during which the increased charge is needed for a test operation, and further controls the capacitive circuit at a reduced charge during non-test conditions. Accordingly, the control circuit mitigates undesirable effects associated with operating the capacitive circuit at higher levels (i.e., were the capacitive circuit maintained at the boost voltage level at all times).

In connection with one or more embodiments, such as those described in connection with the figures, the test threshold voltage is set in one or more of a variety of manners that may depend upon one or more variables, to achieve a charge level in the capacitive circuit that ensures backup operation while allowing the capacitive circuit to be held at a relatively lower charge level during normal (i.e., non-test) operation. In one implementation, the test circuit is configured to set the backup threshold voltage in response to detected operational characteristics, which can be tested and detected at regular intervals (e.g., daily, monthly or yearly) during the lifetime of a backup power supply.

In a more particular embodiment, a test circuit (separate or integrated with the control circuit) sets the test voltage level to a threshold corresponding to a capacitive charge that is sufficient to power the test load and the backup functions, based upon characteristics of the capacitive circuit as detected during test or other operation. In this context, the threshold may correspond to a voltage level that is high enough to provide just enough, or slightly more than enough, charge in the capacitor for operating both the test load and the data storage circuit respectively for test and backup operation. For instance, the threshold may be set at a voltage level that is a predetermined amount (e.g., 0.5V) higher than a voltage level determined to be high enough to store just enough charge in the capacitive circuit for powering the test load and the backup functions of the data storage circuit (i.e., after which the capacitive circuit is drained to a charge level that is insufficient to provide further operating power to the data storage circuit).

In another example embodiment, a test circuit such as that generally described in the preceding paragraph operates to set a threshold based upon the energy (Joules) required by the capacitive circuit for powering backup functions. In this embodiment, the threshold is set to correspond to an energy level (Joules) that is high enough to provide just enough, or slightly more than enough, charge in the capacitor for operating both the test load and the data storage circuit respectively for test and backup operation. As such, the threshold energy level may be set to a level that is a predetermined amount higher than an energy level determined to be sufficient for powering test load and backup functions. A corresponding threshold voltage may also be set to provide the threshold energy level. Depending upon the system, such a threshold voltage may vary depending upon conditions, while the threshold energy level remains the same and/or varies in a different manner.

According to other embodiments, the test circuit sets the test threshold voltage in response to one or more of a variety of conditions, based upon the application and available conditions that relate to the threshold voltage. In one embodiment, the test threshold voltage is set using an offset relative to a backup threshold voltage that is determined to be sufficient for powering the backup functions of the data storage circuit, where the offset represents an additional amount of charge that is sufficient to also power the test load, while maintaining the charge required for powering the backup functions during or after a capacitive drain by the test load. The test circuit may also set the backup threshold voltage, based upon test operation of the capacitive circuit, and thus determine the test threshold voltage as the sum of the determined backup threshold voltage and the offset. Accordingly, as the charge required for backup functions varies, the test threshold voltage can be set using the offset relative to the charge required for backup. This approach may be applicable, for example, to applications in which the charge required for carrying out backup functions increases or decreases relative to demands of the backup functions that are to be carried out. This approach is further applicable to initializing or otherwise performing calibration-type functions in which the backup threshold is determined for a particular application based upon performance, and subsequently used as a base point from which to set future backup and test threshold voltage levels.

In some embodiments, the test circuit determines an initial threshold voltage for one or both of backup and test threshold voltage for a particular capacitive circuit upon initial startup of the circuit. For instance, the test circuit may initially set threshold voltage levels to relatively high levels known to be sufficient for powering backup and test operations. The test circuit then reduces one or both of the backup and test threshold voltage levels in response to determining that the capacitive circuit is capable of providing sufficient charge at a lower voltage level. Such an approach may also be carried out to reduce a threshold voltage level in response to backup power requirements decreasing, and/or in response to improved operational characteristics of the capacitive circuit. In short, the test circuit may adaptively set the backup and/or test threshold voltage based upon operational characteristics of the capacitive circuit as may be detected in real-time or near real-time, during initial setup (to accommodate variances in capacitive circuits) or during regular operation.

In another embodiment, the threshold voltage level of each capacitive circuit is dynamically set upon startup using a sensor arrangement that characterizes the operation of the capacitive circuit in real-time, with the threshold voltage being set based upon the characterization. In some implementations, a real-time clock and a temperature sensor are used to initially characterize operational characteristics of the capacitive circuit (i.e., to characterize the capacitive circuit's ability to provide backup power). This initial characterization is used to set an initial threshold voltage at which the capacitive circuit is set. Such an application may involve, for example, operating a capacitive circuit powered by a battery power supply, such as in a laptop computer.

This approach is further applicable to the implementation of replacement capacitive circuits, in which a deteriorated capacitive circuit can be replaced with a new circuit or in which a capacitive circuit can be replaced with a different circuit that provides a different level of charge. Upon replacement of the capacitive circuit, the test circuit resets a threshold voltage level, having previously been set high to accommodate the deteriorated capacitive circuit, to a lower level in accordance with operational characteristics of the replacement circuit.

In other embodiments, the test circuit sets one or both of the backup and test threshold voltage levels in response to detecting the deterioration of the capacitive circuit during operation of the test load (e.g., by detecting the ability of the capacitive circuit to store and/or provide stored charge). For instance, a capacitive circuit may deteriorate in accordance with temperature-based parametric changes of the capacitive circuit. Where characteristics of the capacitive circuit detected during test operation indicate that the capacitive circuit has lost some ability to hold and/or provide charge, the threshold can be set to a higher voltage level, or where an offset relative to a backup threshold is used, the offset can be increased. The backup threshold voltage can be set in a similar manner, by increasing the backup threshold voltage level in response to the capacitive circuit losing ability to hold and/or provide charge.

In another example embodiment, a data storage device includes a volatile-type memory that requires power to maintain stored data, and a backup power circuit that powers the data storage device in response to a power interruption or other condition requiring an alternate power source for backup. The backup power circuit includes a capacitive circuit that stores charge, a control circuit to charge the capacitive circuit, and a test circuit to test the capacitive circuit. The capacitive circuit is coupled to power the data storage device for executing backup functions in response to a power interruption, such as by storing data that would otherwise be lost, and for performing other functions such as erasing for security purposes. The capacitive circuit also powers a test load that is used to test the capacitive circuit, for determining a characteristic of the operation of the capacitive circuit. The control circuit charges the capacitive circuit to a backup threshold voltage for powering the backup functions of the data storage device, and raises the charge in the capacitive circuit to a higher test threshold voltage for powering the test load. During test operation and in response to the capacitive circuit powering the test load, the test circuit detects operational characteristics of the capacitive circuit and sets the test threshold voltage in response to the detected operational characteristics.

In a manner that may be implemented similarly to those described above, the test threshold voltage for the data storage device is set to a level that is sufficiently high to ensure that the capacitive circuit stores enough charge to power both the test load and the backup functions of the data storage device, in the event of a power interruption or fluctuation while the test load is being powered. In this context, a sufficiently high level corresponds to such a level that provides enough charge in the capacitive circuit to power the respective data storage device and test load as discussed above, and would vary depending upon the nature of the connected circuits and the ability of the capacitive circuit to store and provide charge. The capacitor may thus be configured and/or operated to hold a charge that is sufficient to provide substantially all of the operating power to the data storage device for backup functions during a minimum time period sufficient to permit transfer of a cached portion of data stored in a volatile-type memory circuit to a non-volatile-type memory circuit (e.g., a solid-state circuit that does not require power to maintain stored data), and to perform other required backup functions relating to the same.

For example, where the backup memory functions of the data storage device require relatively little charge, the test threshold voltage can be set to a level that provides that charge, as well as any additional charge that the test load requires (i.e., the test load drains a portion of the stored charge on the capacitive circuit, with the remaining charge needing to be sufficient to power the backup functions). Similarly, where the test load requires relatively little charge, the increased charge level corresponding to a difference between the backup threshold voltage and the test threshold voltage can be relatively small. However, as either or both of the respective backup functions and test load require relatively higher charge, the respective backup and test threshold voltages are set relatively higher. Moreover, the capability of the capacitive circuit varies.

The following discussion of the Figures and the embodiments shown therein represent exemplary implementations of various embodiments, which may be implemented in connection with one or more approaches as described above, in connection with other figures and/or in the claims section that follows. Many different combinations of data storage/memory circuits, power supplies, control circuits and other device/system circuits may be used in accordance with various aspects of the present invention, and may involve one or more of the systems and/or approaches as shown in the figures. In addition, various discussion refers to "memory" and/or "data storage," where one or both terms may refer to similar or the same types of devices and systems, as well understood in the relevant art.

Figure 1:
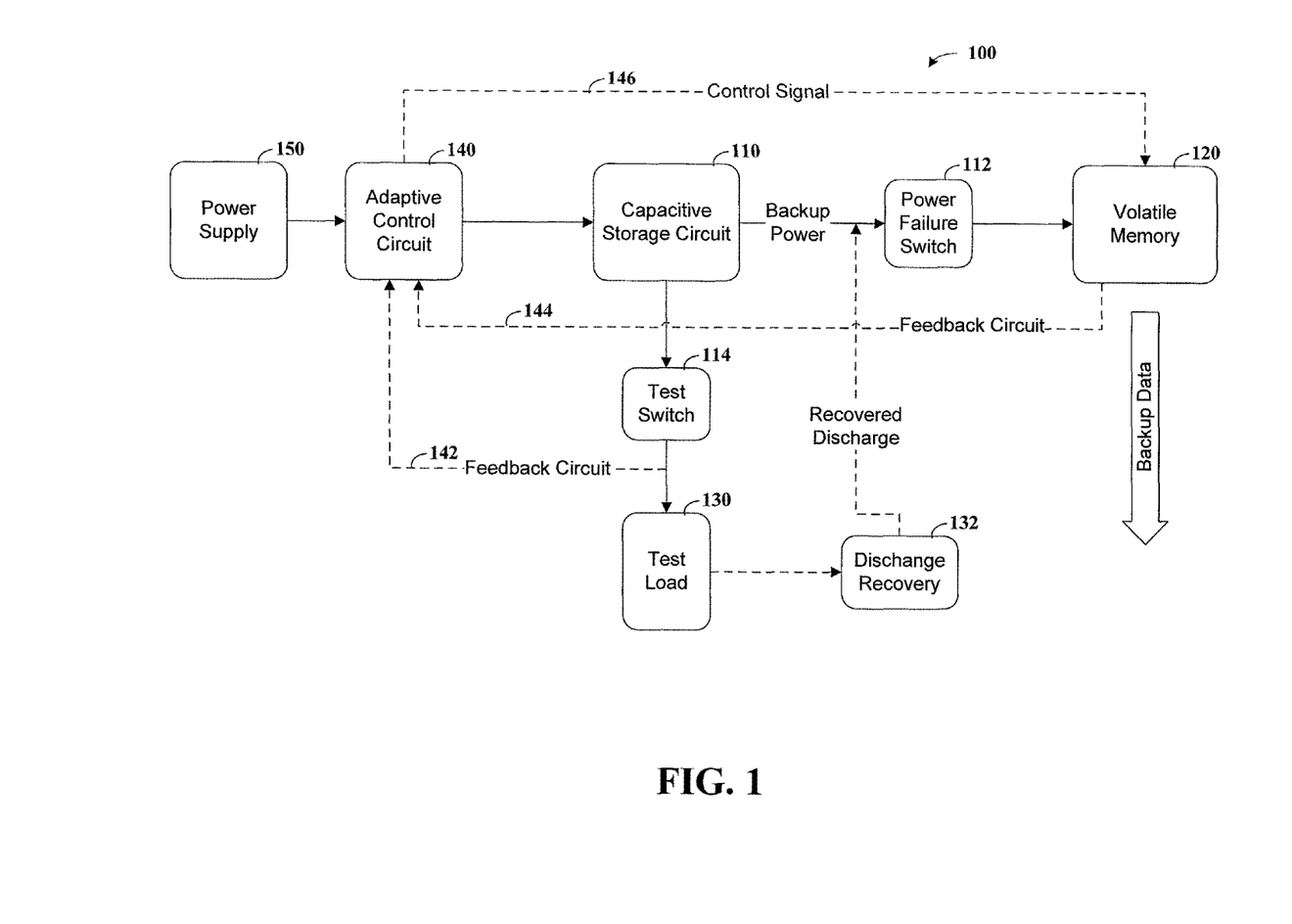
FIG. 1 shows a system for providing backup power to operate memory backup functions in response to a power interruption, according to an example embodiment of the present invention.

Turning now to the figures, FIG. 1 shows a system 100 for providing backup power to operate backup functions of a data storage device in response to a power interruption, according to another example embodiment of the present invention. The system 100 includes a capacitive storage circuit 110 that is coupled to power volatile memory 120 to transfer data for backup (i.e., to non-volatile memory), and that is further coupled to a test load 130 for test operation of the capacitive storage circuit. As part of a test operation, the control circuit 140 boosts the charge in the capacitive storage circuit 110 to store charge therein as relative to the amount of charge required for powering the test load 130. That is, the control circuit 140 boosts the charge in the capacitive storage circuit 110, prior to powering the test load 130, to a level that is high enough to power the test load 130 while reserving enough charge to also power backup functions of the volatile memory 120 in the event of a power failure (e.g., during and/or soon after the test).

After testing is complete, the charge in the capacitive storage circuit 110 can be maintained and/or returned to a preboost voltage level, which is generally set to ensure that sufficient charge is available in the capacitive storage circuit for powering the memory 120 (and related circuitry, where appropriate) for the aforesaid backup functions. Accordingly, the capacitive storage circuit 110 can be maintained at a relatively lower voltage level (and with corresponding charge storage) during non-test operation, and is boosted to a higher voltage level for test operation, which reduces the overall charge level on the circuit. The control circuit 140 thus controls the application of the boost to mitigate undesirable effects upon the capacitive storage circuit 110 as relative to maintaining a higher voltage level thereat.

By way of example, a power supply 150 is shown coupled to the control circuit 140, for providing power for boosting the charge in the capacitive storage circuit 110 and/or for charging the capacitive storage circuit to normal (non-test) levels for powering backup operation of the volatile memory 120. Also by way of example, switches 112 and 114 are respectively shown for powering the volatile memory 120 and the test load 130, with the switches implemented and controlled to suit the above-described approaches.

Figure 5A:
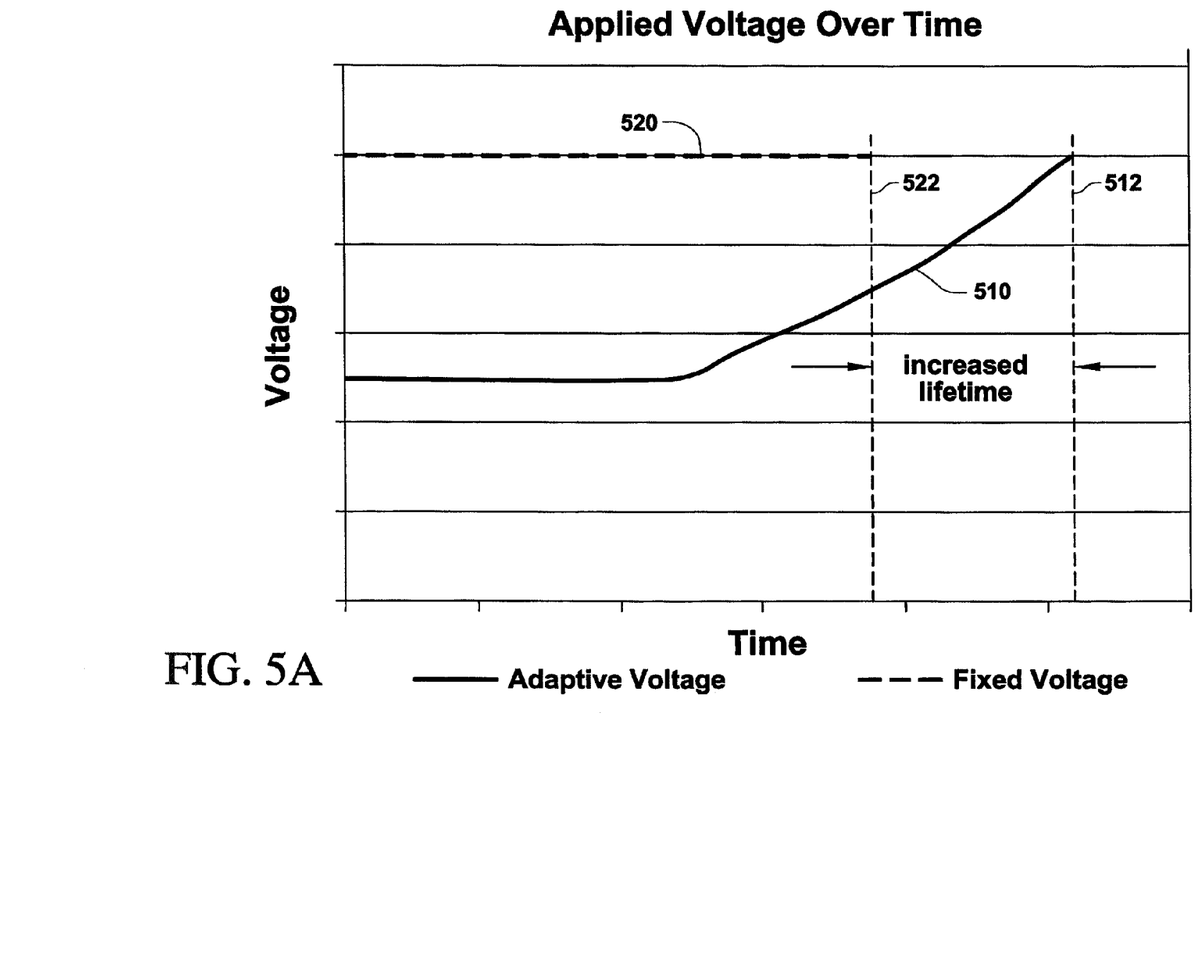
FIG. 5A shows plots of backup power capacitor voltage for respective applications using controlled and flat voltage/charging approaches, relative to other example embodiments of the present invention.
Figure 5B:
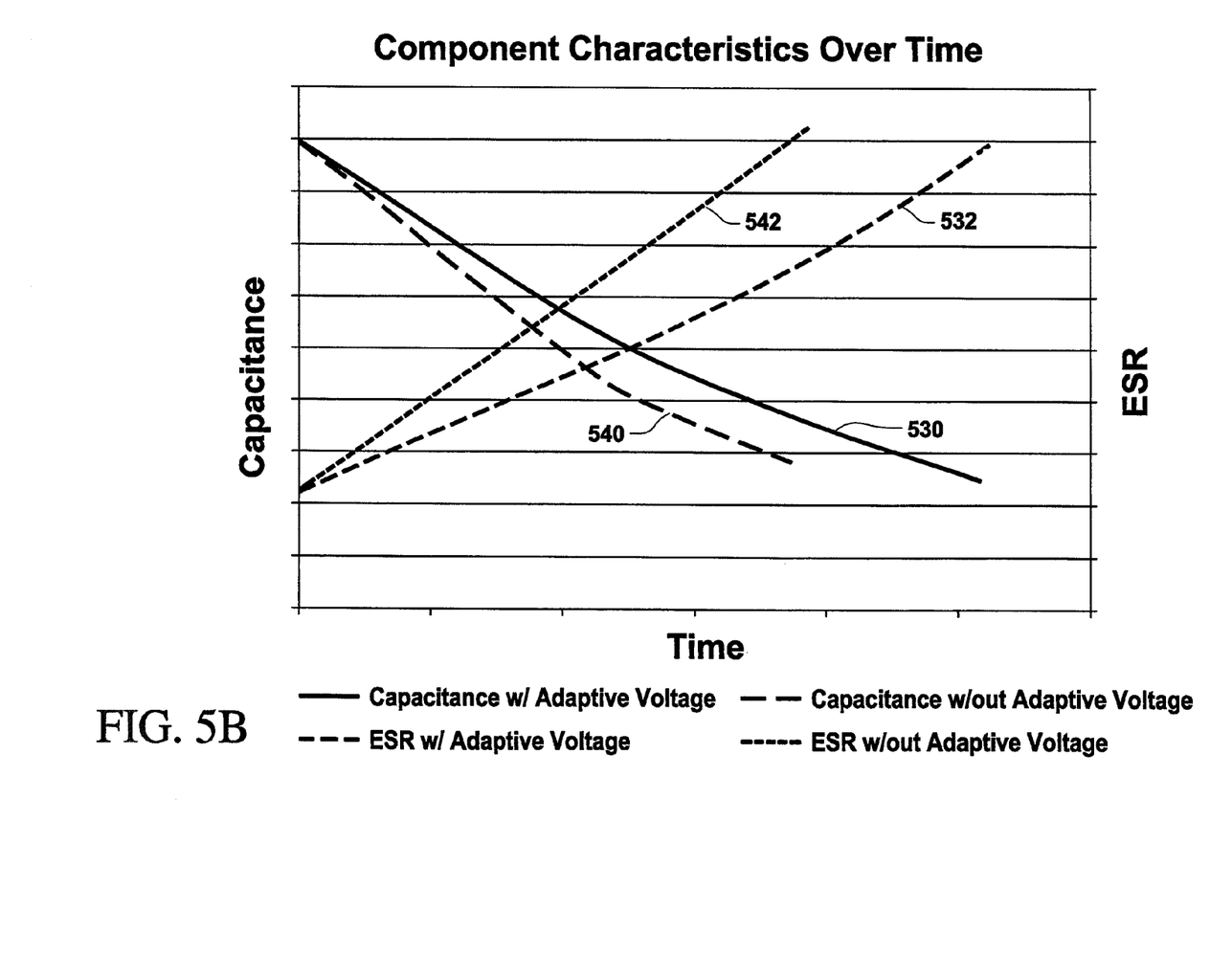
FIG. 5B shows plots depicting the ability of capacitors, respectively corresponding to the plots shown in FIG. 5A, to provide charge for powering backup functions relative to a threshold, according to another example embodiment of the present invention.

In some implementations, a feedback circuit 142 provides feedback to the control circuit 140, with the feedback being indicative of the ability of the capacitive storage circuit 110 to power the test load 130. The control circuit 140 uses the feedback to set a test threshold voltage for boosting the charge in the capacitive storage circuit 110, which can be adjusted based upon the amount of charge needed to power the test load 130 and/or the performance of the capacitive storage circuit. This feedback circuit 142 and related approach to setting the threshold voltage may be used, for example, in connection with various embodiments as described herein, to set the test (boost) threshold voltage and, in some instances, to set a normal (backup) threshold voltage at which the capacitive storage circuit 110 is maintained. For certain applications, the backup threshold voltage is set based upon the feedback and the test threshold circuit is set relative to the backup threshold voltage. FIG. 5 and the discussion thereof exemplify approaches to adjusting threshold voltage as the operation of a storage capacitor (e.g., super capacitor) deteriorates over time.

In connection with another example embodiment, the control circuit 140 monitors operational characteristics of the volatile memory 120 via feedback circuit 144 and schedules test cycles during periods of low memory usage. The control circuit 140 accordingly operates the capacitive storage circuit 110 at a lower test threshold level than would be required, were the capacitive storage circuit operated to power test load 130 during high memory usage periods (i.e., which require relatively higher power to perform backup functions). In some implementations, the control circuit 140 sets the test threshold voltage to a predefined level and limits test cycles to periods of low memory operation during which the test threshold voltage is sufficient to power the test load and also power backup functions of the memory 120.

In another example embodiment, the control circuit 140 monitors the memory 120 via the feedback circuit 144 and dynamically controls the operating voltage of the capacitive storage circuit 110 in response to a current operating state of the memory and its respective power requirements for executing backup functions. Under such conditions, the control circuit 140 operates the capacitive storage circuit 110 at a lower voltage level when less power is required to operate backup functions of the volatile memory 120, such as during periods of low memory activity, and increases the voltage level at which the capacitive storage is operated during periods of higher memory activity. In some instances, the control circuit 140 directly monitors operating characteristics of the memory 120, such as an amount of data stored, to determine necessary backup charge. In other instances, the control circuit monitors an operating state of the memory 120 and sets the backup threshold voltage at which the capacitive storage circuit 110 is operated to a level corresponding to a predefined operating state of the memory (e.g., where the memory may have two or more predefined states). For test cycles, the control circuit 140 boosts the current operating voltage of the capacitive storage circuit 110 to an increased boost level that is relative to the current operating voltage level and accordingly sufficient to power the test load 130 as well as the memory 120, based upon the current power needs of the memory.

In still another example embodiment, the adaptive control circuit 140 provides a control signal 146 to the memory 120 to limit the operation of the memory to a level at which the capacitive storage circuit 110 is capable of providing sufficient power to operate backup functions. For example, if the capacitive storage circuit 110 is operating in a test cycle to power the test load 130, the stored charge is drained to some extent, such that less is available to power backup functions. The adaptive control circuit 140 accordingly limits the operation of the memory 120 such that it does not operate to increase its required backup power unless (or until) the capacitive storage has sufficient stored charge to power the backup functions.

One example implementation involving such control of the memory 120 is as follows. Upon initiation of a backup cycle, the adaptive control circuit 140 determines a test voltage level at which to charge the capacitive storage circuit 110 in order to operate backup functions of the memory 120 in its current state, as well as power the test load 130. The adaptive control circuit 140 charges the capacitive storage circuit 110 to this determined test voltage level, and controls the memory 120 so that its operating state does not require backup power that would exceed that available in the capacitive storage circuit 110. Upon completion of the test cycle (and/or during the test cycle if appropriate), the adaptive control circuit 140 outputs control signal 146 to control the memory 120 to operate in a state requiring increased backup power as the control circuit further operates to charge the capacitive storage circuit 110 to support the required backup power level. This control signal 146 thus may involve a delay or other type of signal that permits the charging of the capacitive storage circuit to account for increased power needs of the memory 120.

In another implementation, the system 100 further includes a discharge recovery circuit 132 that stores energy discharged via the test load 130 and provides the stored energy for use by the memory 120 in the event of a power failure. The discharge recovery circuit 132 may, for example, include a capacitor or inductor that stores discharged energy for this purpose.

In still another example embodiment, two or more capacitive storage circuits such as the circuit 110 are used to provide backup power for the memory 120. The adaptive control circuit 140 controls the voltage level at which each of the capacitive storage circuits is maintained, and further controls each circuit under test cycles. The combined charge stored in each circuit is made available to the memory 120 for backup functions. In this regard, threshold voltage levels set for each circuit are done in a manner that takes the available charge in the other of the circuits into consideration. For instance, if the capacitive storage circuits are operated in mutually exclusive test cycles, the net increase in charge required to account for the charge needed for the test cycle can be split between the capacitive storage circuits (e.g., each circuit is charged to a boost voltage level that respectively accounts for about half of the required charge for the test cycle).

Figure 2:
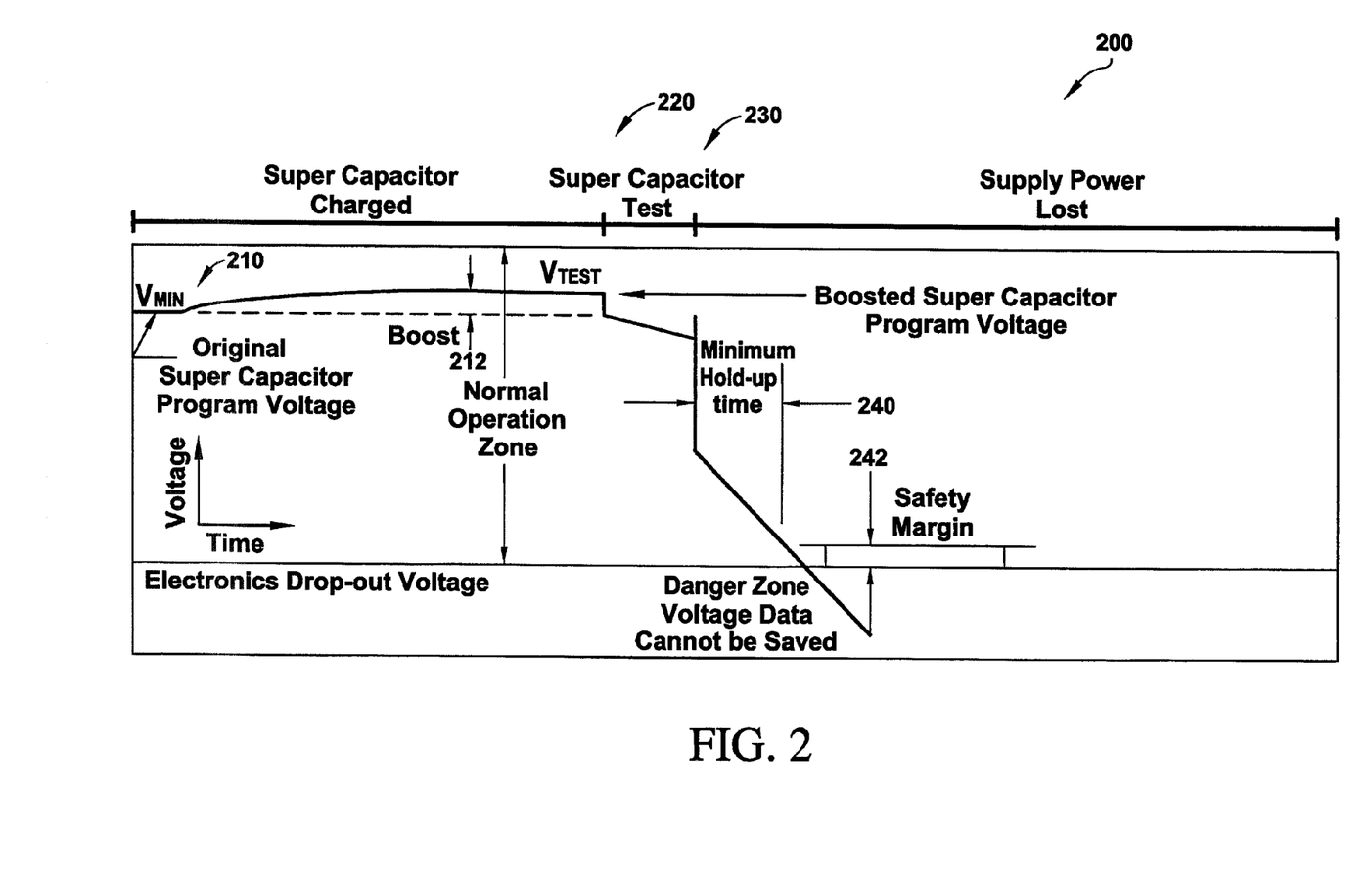
FIG. 2 shows a plot of conditions for operating a backup power supply for a data storage device, according to another example embodiment of the present invention.

FIG. 2 shows a plot 200 of conditions for operating a backup super capacitor power supply for a data storage device, according to another example embodiment of the present invention. The plot 200 shows exemplary voltage application over time for boosting the charge in a super capacitor, with operation of the super capacitor to power a test load and, in response to a power failure, to power a data storage circuit to carry out backup functions. The operation of the backup super capacitor power supply as represented in FIG. 2 may be implemented, for example, in connection with the system 100 shown in FIG. 1.

Referring to the plot 200, a super capacitor is operated at a backup threshold voltage, characterized by way of example as "$V_{MIN}$," representing a voltage level needed to provide sufficient charge for operating backup functions of a data storage circuit. This threshold voltage is generally set to a level at which sufficient charge is stored in the super capacitor for operating a data storage circuit for a particular amount of time during which backup functions such as writing data to non-volatile memory and erasing volatile memory, with some degree of safety allotting for additional charge (e.g., as represented by safety margin 242).

In preparation for a test cycle (or as an initial stage in a test cycle), the voltage level of the super capacitor is raised a "boost" level 212 above $V_{MIN}$, to a resulting test voltage level $V_{TEST}$ during a charging period 220. Once the super capacitor is charged to the $V_{TEST}$ voltage level, a test cycle 230 is carried out, in which the super capacitor powers a test load, which drains the charge in the super capacitor. By way of example, plot 200 shows the super capacitor being drained to a level below $V_{MIN}$, yet this level may vary depending upon the application and any safety margin built into $V_{MIN}$.

Upon power loss during or near the end of a test cycle (i.e., after a test load starts to drain charge), the super capacitor supplies power to a data storage circuit to carry out backup functions of the circuit for a hold-up time represented at 240, set to a minimum level required for carrying out such functions. During this time, backup functions are carried out using the power from the super capacitor, which drains the super capacitor as shown. By appropriately setting $V_{MIN}$ and $V_{TEST}$, the super capacitor maintains an appropriate power supply to the data storage circuit to meet the hold-up time (240), permitting backup functions to be carried out in order to store data and perform other functions as required.

Figure 3:
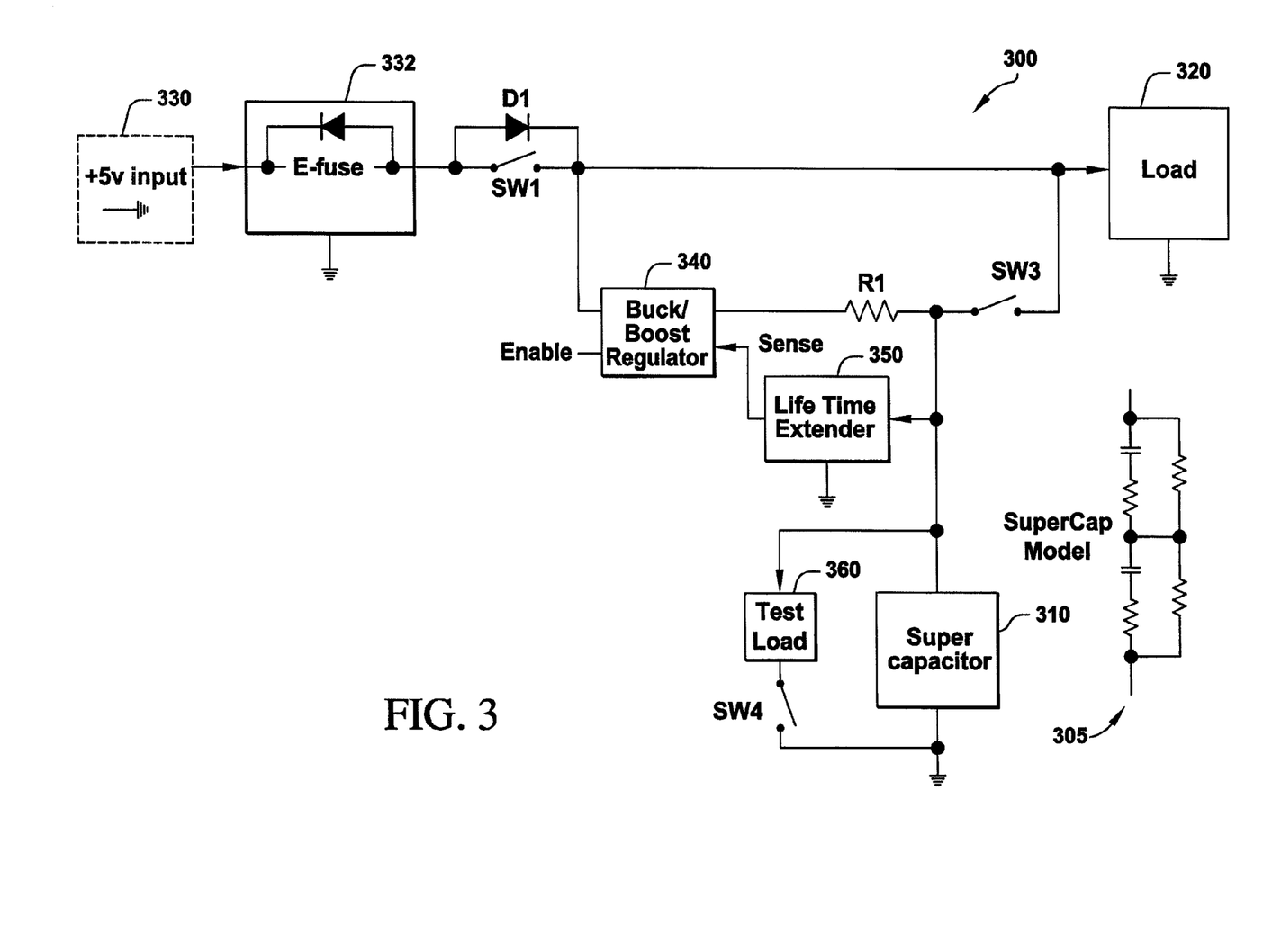
FIG. 3 shows a system diagram of a data storage circuit, according to another example embodiment of the present invention.

FIG. 3 shows a system diagram of a data storage circuit 300, according to another example embodiment of the present invention. The data storage circuit 300 includes a super capacitor 310 that supplies power to a load 320, representing a volatile-type memory to be powered for backup operation in response to a power interruption condition. The super capacitor 310 stores charge provided by a power supply 330, which also powers the load 320 via fuse 332 and related circuitry. A voltage regulator 340 (controller) controls the voltage level of the super capacitor 310, and charges the super capacitor to a boost voltage level for test conditions during which the super capacitor powers a test load 360. A life time extender circuit 350 further provides a control input to the boost regulator 340, which uses the control input to set threshold voltage level operation of the super capacitor 310 using, for example, one or more approaches as described herein. By way of example, model 305 represents a circuit model of the circuit 300.

Figure 4:
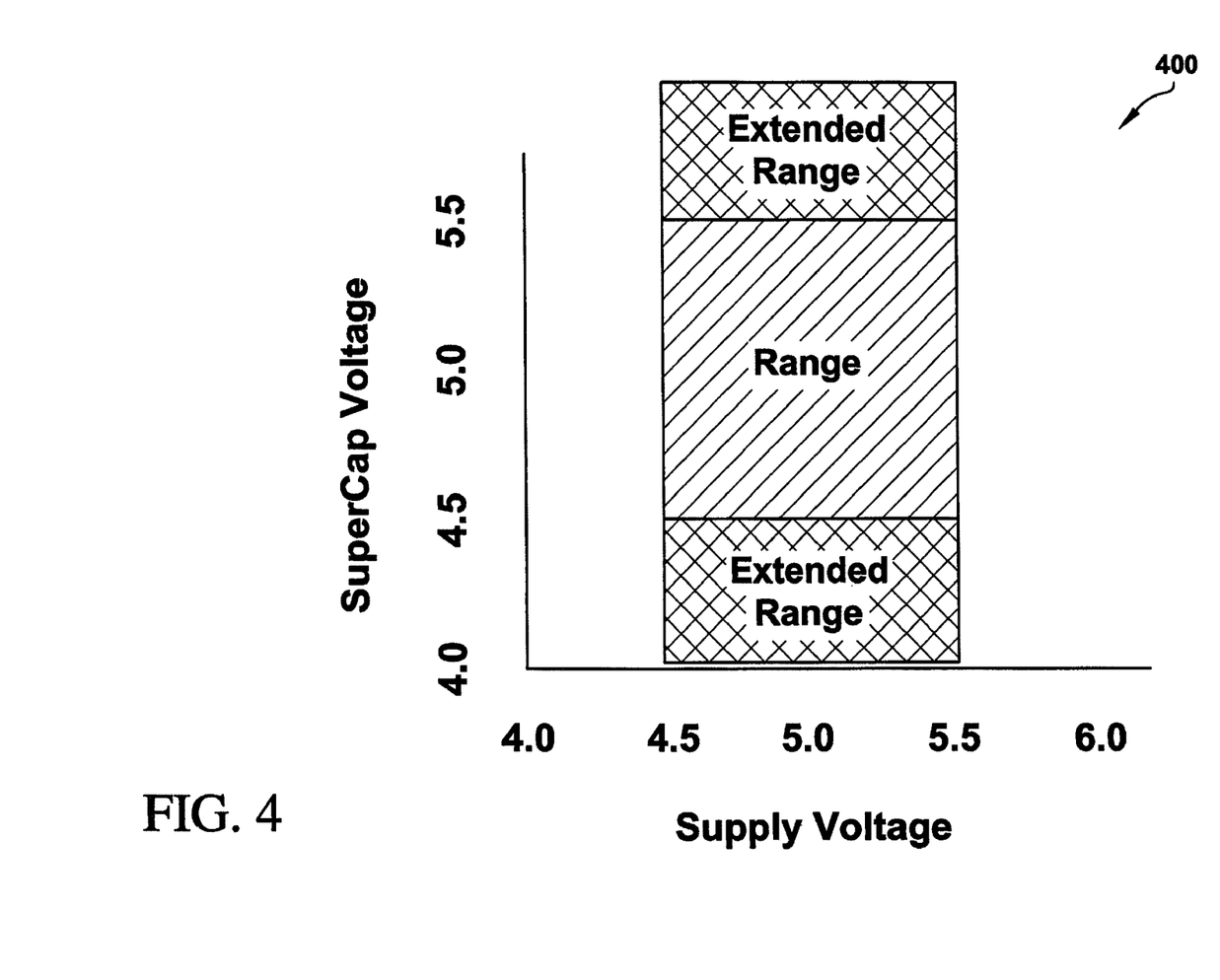
FIG. 4 shows a bar graph for exemplary operation of a backup power capacitor versus supply voltage, consistent with another example embodiment of the present invention.

The capacitive circuits and related circuitry as described herein can be implemented in a variety of manners, including those discussed above. Accordingly, FIG. 4 shows a bar graph for exemplary operation of a backup power capacitor versus supply voltage for identifying and operating a capacitor at a low (e.g., minimum) operating voltage, consistent with another example embodiment of the present invention. Generally, at supply voltages between 4.5 and 5.5 volts, the backup power capacitor voltage (e.g., super capacitor or supercap voltage as shown) is held between 4.5 and 5.5 volts in a normal operating range, and can be operated slightly above and below this range in an extended range, depending upon the condition of the backup power capacitor. In some implementations, the upper extended range as shown is avoided, and the backup power capacitor is operated in a reduced range (e.g., below 5.3 V), limiting the power supplied to the backup power capacitor from a power supply. This condition (i.e., operation in response to a supply voltage) can be monitored with test circuitry as described herein, and used to set the threshold voltage level for backup type operating conditions, to ensure that the charge applied to the backup power capacitor is sufficient to permit backup operation of a data storage circuit. This approach can further be used in connection with controlling the backup power capacitor under test conditions, and boosting the voltage level of the backup power capacitor to ensure its ability to power backup functions of a data storage circuit concurrently or otherwise in connection with test cycle operation.

FIG. 5A shows plots 510 and 520 of backup power capacitor voltage for respective applications using a controlled voltage/charging approach and a flat voltage/charging approach, relative to an example embodiment of the present invention. Each of the respective plots represents exemplary voltage levels applied to a capacitor over time, with the net lifetime of the respective capacitors shown as terminating at the vertical lines 512 and 522. The net lifetime may, for example, correspond to an ability of the capacitive circuit to provide a threshold level of power under indicated charging conditions (e.g., a variable voltage as in plot 510, or fixed voltage as in plot 520). The performance of the capacitor is tracked and used to set a threshold voltage for backup operation as shown in plot 510. As the monitored capacitor deteriorates in its ability to store and provide charge, related threshold voltages at which the capacitor is operated are increased to accommodate this deterioration.

FIG. 5B shows plots depicting exemplary capacitance and equivalent series resistance (ESR) ability of capacitors such as those corresponding to the plots 510 and 520 in FIG. 5A, according to another example embodiment of the present invention. Plots 530 and 532 respectively show capacitance and ESR of a capacitive circuit operated using an adaptive voltage charging approach in accordance with one or more embodiments as described herein and as applicable to plot 510 in FIG. 5A. Plots 540 and 542 respectively show capacitance and ESR of a capacitive circuit operated at a fixed voltage level, as applicable to plot 520 in FIG. 5A. Over time, the capacitance decreases less and the ESR increases less for the capacitive circuit operated with adaptive voltage, relative to such a circuit operated at a fixed voltage that is initially higher. By monitoring the performance of the capacitive storage circuit and accordingly limiting the voltage applied to charge the storage circuit, the lifetime of the circuit as operating in accordance with desirable storage capabilities can be extended as shown.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include variations of the type of backup power source, variations in threshold voltage settings, variations in test application and implementation, and variations in the number and type of circuits that are being powered under backup. Other changes involve using control circuits arranged differently than those shown, yet carrying out functions as described in accordance with one or more example embodiments. For instance, the adaptive control circuit 140 in FIG. 1 may be implemented outside of a connection between the power supply 150, and used to separately control the amount of charge stored in the capacitive storage circuit 110. Similarly, functions carried out by the test switch 114 and/or aspects of the test load circuit 130 may be carried out in connection with the control circuit 140, for detecting conditions of the capacitive storage circuit 110. Various control techniques and controllers may be implemented to operate circuits in response to power interruption as described herein, such as those controllers and controller functions as described in U.S. Pat. No. 7,269,755 to Moshayedi et al., which is fully incorporated herein by reference. Such modifications and changes do not depart from the true spirit and scope of the present invention, which is set forth in the following claims.

What is claimed is:

1. A backup power circuit for powering a data storage circuit in response to a power interruption, the circuit comprising:
   a capacitive circuit configured to store and use capacitive energy for powering backup functions of the data storage circuit in response to a power interruption, and for powering a test load to test the capacitive circuit;
   a test circuit configured to detect operational characteristics of the capacitive circuit in response to the capacitive circuit powering the test load; and
   an adaptive control circuit configured to, in response to the detected operational characteristics
      set the charge in the capacitive circuit to a backup threshold voltage for powering the backup functions of the data storage circuit, and
      set the charge in the capacitive circuit to a test threshold voltage for powering the test load during a test period, the test threshold voltage being higher than a backup threshold voltage needed by the capacitive circuit in order to power the backup functions during the test period.

2. The circuit of claim 1, wherein the adaptive control circuit is configured to set the backup threshold voltage in response to the detected operational characteristics.

3. The circuit of claim 1, wherein the adaptive control circuit is configured to set the test threshold voltage, relative to the backup threshold voltage, in response to the detected operational characteristics.

4. The circuit of claim 1, wherein the adaptive control circuit is configured to set the backup threshold voltage in response to the detected operational characteristics, and to set the test threshold voltage based upon the backup threshold voltage and the detected operational characteristics.

5. The circuit of claim 1, wherein
   the test circuit is configured to detect operational characteristics of the capacitive circuit by detecting the ability of the capacitive circuit to store and provide energy to power the test load, and
   the adaptive control circuit is configured to set the test threshold voltage at a voltage level sufficient to charge the capacitive circuit to provide sufficient energy to power both the backup functions of the data storage circuit and the test load, in response to the detected ability of the capacitive circuit to store and provide energy.

6. The circuit of claim 1, wherein
   the test circuit is configured to detect operational characteristics of the capacitive circuit by detecting the ability of the capacitive circuit to store energy, and
   the adaptive control circuit is configured to set the test threshold voltage at a voltage level sufficient to charge the capacitive circuit for powering both the backup functions of the data storage circuit and the test load, in response to the detected ability of the capacitive circuit to store energy.

7. The circuit of claim 1, wherein
the test circuit is configured to detect operational characteristics of the capacitive circuit by detecting the ability of the capacitive circuit to store and provide energy to power the test load, and
the adaptive control circuit is configured to set the backup threshold voltage at a voltage level sufficient to charge the capacitive circuit for powering the backup functions of the data storage circuit, in response to the detected ability of the capacitive circuit to store and provide energy.

8. The circuit of claim 1, wherein the test circuit is configured to
operate the capacitive circuit to power the test load under multiple test voltage conditions during an initialization test cycle,
detect operational characteristics of the capacitive circuit by detecting the ability of the capacitive circuit to store and provide energy to power the test load under each of the multiple test voltage conditions, and
in response to the detected ability of the capacitive circuit to store and provide energy, set the backup threshold voltage at a reduced backup threshold voltage level that is sufficient to charge the capacitive circuit for providing energy to power the backup functions of the data storage circuit.

9. The circuit of claim 1, wherein the test circuit is configured to
successively operate the capacitive circuit to power the test load at a predetermined interval to detect the operational characteristics of the capacitive circuit, and
in response to detecting a deterioration in operation of the capacitive circuit via the successive operation of the capacitive circuit, set the backup threshold voltage at an increased voltage level to store sufficient power for powering backup functions of the data storage circuit.

10. The circuit of claim 1, wherein the test circuit is configured to set the test threshold voltage to a new value in response to temperature-based parametric changes of the capacitive circuit.

11. The circuit of claim 1, wherein the adaptive control circuit is configured to dynamically set the backup threshold voltage in response to real-time operational characteristics of the data storage circuit to increase the stored energy in the capacitive circuit as backup power requirements of the data storage circuit increase, and to decrease the stored energy in the capacitive circuit as backup power requirements of the data storage circuit decrease.

12. The circuit of claim 1, wherein the adaptive control circuit is configured to dynamically set the backup threshold voltage according to a predefined state of the data storage circuit.

13. The circuit of claim 1, wherein the adaptive control circuit is configured to control the operation of the data storage circuit to limit the amount of backup power required for powering the backup functions of the data storage circuit, based upon capacitive energy stored in the capacitive circuit.

14. The circuit of claim 1, wherein the adaptive control circuit operates the capacitive circuit in a test cycle for powering the test load to test the capacitive circuit during a low-power state of the data storage circuit.

15. The circuit of claim 1, further including a discharge storage circuit coupled to the test load to store capacitive energy drained from the capacitive circuit and to provide the stored capacitive energy for use in powering the data storage circuit in response to a power interruption.

16. The circuit of claim 1,
further including a second capacitive circuit configured to store and use capacitive energy for powering backup functions of the data storage circuit in response to a power interruption, and for powering a test load to test the capacitive circuit,
wherein the test circuit is configured to detect operational characteristics of the capacitive circuit in response to the second capacitive circuit powering the test load,
wherein the adaptive control circuit is configured to, in response to the detected operational characteristics of the capacitive circuits
set the charge in the respective capacitive circuits to backup threshold voltages for powering the backup functions of the data storage circuit, and
set the charge in the respective capacitive circuits to test threshold voltages during a test period in which one of the capacitive circuits is used to power the test load, the test threshold voltages being higher than a backup threshold voltage needed by the respective capacitive circuits to cooperatively power the backup functions during the test period.

17. A backup power control circuit for charging a capacitive circuit that stores and uses capacitive energy for powering backup functions of a data storage circuit and for powering a test load during a test condition, the circuit comprising:
a voltage supply circuit coupled to the capacitive circuit for charging the capacitive circuit from a backup voltage level to a higher boost voltage level; and
a controller configured to control the voltage supply circuit to boost the charge in the capacitive circuit from the backup voltage level to the boost voltage level for powering the test load during the test condition, and to control the capacitive circuit to return to the backup voltage level under non-test conditions, and to set the boost and backup voltage levels based upon the operation of the capacitive circuit during the test condition.

18. The circuit of claim 17, wherein the controller is configured to control the voltage supply circuit to
charge the capacitive circuit to the backup voltage level during non-test conditions, and
after boosting the charge in the capacitive circuit to the boost voltage level for a test condition, upon completion of the test condition, control the voltage supply circuit to permit the capacitive circuit to return to the backup voltage level and to maintain the capacitive circuit at the backup voltage level.

19. The circuit of claim 17, wherein the controller sets the backup voltage level to a threshold level that sufficiently charges the capacitive circuit to at least a minimum threshold charge required to operate the data storage circuit to carry out the backup functions during non-test conditions, and that insufficiently charges the capacitive circuit to operate the data storage circuit to carry out the backup functions while the capacitive circuit is powering the test load under the test condition.

20. A solid-state data storage device comprising:
a primary solid-state memory circuit configured and arranged to maintain data integrity in the absence of operating power;
a caching memory circuit mapped to the primary memory circuit, configured and arranged to provide access to a set of data representing a cached portion of memory that is mapped to the primary memory circuit;

a power supply configured to supply operating power to the caching memory circuit;

a backup power circuit including a capacitive circuit configured to store capacitive energy and coupled to use the stored capacitive energy to provide power to the caching memory circuit and the primary solid-state memory circuit for backing up data in the caching memory circuit;

a test circuit configured to detect operational characteristics of the capacitive circuit under a test condition; and a control circuit configured to charge the capacitive circuit to a threshold voltage that is set in response to the detected operational characteristics, and to control the capacitive circuit to provide power to the caching memory circuit and the primary solid-state memory circuit in response to an interruption in power from the power supply.

* * * * *